(12) United States Patent
Lin

(10) Patent No.: US 6,625,044 B2
(45) Date of Patent: Sep. 23, 2003

(54) PROGRAMMED ISOLATING STARTING SYSTEM AND METHOD OF A SWITCHING POWER SUPPLY

(75) Inventor: Jiaun-Long Lin, Taoyuan Hsien (TW)

(73) Assignee: Chung Shan Institute of Science and Technology, Taochun (TW)

( * ) Notice: Subject to any disclaimer, the term of this patent is extended or adjusted under 35 U.S.C. 154(b) by 0 days.

(21) Appl. No.: 09/998,308

(22) Filed: Dec. 3, 2001

(65) Prior Publication Data

US 2003/0103363 A1 Jun. 5, 2003

(51) Int. Cl.$^7$ .............................................. H02M 7/517
(52) U.S. Cl. .......................................... 363/49; 363/95
(58) Field of Search ..................... 363/49, 95

(56) References Cited

U.S. PATENT DOCUMENTS

| | | | | | |
|---|---|---|---|---|---|
| 4,686,616 A | * | 8/1987 | Williamson | ................... | 363/49 |
| 4,887,199 A | * | 12/1989 | Whittle | ........................ | 363/49 |
| RE34,462 E | * | 11/1993 | Whittle | ........................ | 363/49 |
| 5,555,167 A | * | 9/1996 | Fujihashi | ..................... | 363/49 |
| 5,640,317 A | * | 6/1997 | Lei | ............................. | 363/49 |
| 5,661,642 A | * | 8/1997 | Shimashita | ................... | 363/49 |
| 5,812,383 A | * | 9/1998 | Majid et al. | .................. | 363/49 |
| 6,335,519 B1 | * | 1/2002 | Cho et al. | ..................... | 363/49 |
| 6,434,025 B2 | * | 8/2002 | Shirai et al. | .................. | 363/49 |

* cited by examiner

*Primary Examiner*—Jeffrey Sterrett
(74) *Attorney, Agent, or Firm*—Birch, Stewart, Kolasch & Birch, LLP

(57) ABSTRACT

A kind of programmed isolating starting system and method of a switching power supply. A pulse width modulator (PWM) is placed in the secondary circuit of the invention. The programmed isolating starting circuit provides the necessary power for controlling the IC of the PWM when the system starts. Once the system starts, the programmed isolating starting circuit does not work anymore, and the successive power is provided by the secondary output. If it is necessary to restart, the hardware and the program can automatically restart the system in the invention. At the same time, the system can be started and the working voltage can be provided via the hardware and the software even when the input voltage has a very large difference.

9 Claims, 9 Drawing Sheets

PROGRAMMED ISOLATING STARTING SYSTEM AND METHOD OF A SWITCHING POWER SUPPLY

BACKGROUND OF THE INVENTION

1. Field of the Invention

The invention relates to a kind of programmed isolating starting system and method of a switching power supply. It is applied to the power supply made by a pulse width modulator.

2. Related Art

A switching power supply is one kind of power supply, which is mainly applied to a pulse width modulator (abbreviated below as PWM), and is used to modulate the output voltage. However, because of the demands of safety regulations and the nature of electricity, it is necessary to isolate the electricity between the primary circuit and the secondary circuit. There are two kinds of isolating methods at present:

A. Put the PWM at the primary circuit; the secondary feedback signal is isolated by the "optocoupler" or the "isolated feedback generator". This signal is sent to the controlling IC (integrated circuit) of the primary PWM to modulate the pulse width, and to drive the starting switch. Another kind of magnetic amplifier circuit controls the magnetic reset current via the secondary feedback signal, so it can suppress the valid magnitude of the secondary pulse width to achieve the objective of regulating the power.

B. Put the PWM at the secondary circuit. The primary circuit is used as an isolating auxiliary power supply, which supplies the necessary power to the controlling IC of the PWM. The output (secondary) feedback signal is sent directly to the PWM to control the IC, and couples and drives the primary switch via the isolation of the driving transformer.

In the isolating method A, the starting method is considered to save power. Therefore, the starting current is provided by the input power to drive the switch in an on-off state of the power transformer to couple the energy. One additional winding of auxiliary power is wound on the power transformer in order to supply the power when the controlling IC of the PWM works continuously. The power saved=(input voltage−auxiliary power voltage)*the working current of PWM IC. The starting current of this starting method is much smaller than the working current; the working voltage (auxiliary power) is about 10–20 Volts.

In the isolating method B, in general, the isolating auxiliary power is directly used as the starting power.

The isolating method via the optocoupler in method A above is quite easy for the circuit. However, it has several restrictions: 1. The error of the current transfer ratio (CTR) is very large when products are made. 2. The magnitude of the driving current and the change of temperature can have a large influence on the CTR, with a non-linear relation. 3. The stability is not good, and the CTR decreases with time. 4. The bandwidth is not wide and the echo response is not good. 5. Compensation needs to be done twice.

The circuit isolated feedback generator in method A is quite complicated. Although a specific IC (UC3901) can simplify the circuit, there are still several problems and restrictions as follows: 1. The frequency of the isolated feedback generator (about 1–5 MHz) is different from the power switch. Since the layout is not good and interference is common, it is not easy to compensate. 2. It is not popular and the market is not big enough. 3. The cost is quite high. 4. Compensation needs to be done twice.

The circuit of the isolating method with the magnetic amplifier in method A is complicated. Although the specific IC (UC3838) can simplify the circuit, there are still several problems and restrictions as below: 1. Very large reset current will be necessary during the short circuit protection. The saturated core (which is equal to a switch) becomes very hot due to the rapid increase of core loss, so the character of the core material changes. Unless heat radiating measures are appropriate (e.g., enlarging the iron core), the short circuit cannot be too long. 2. The saturated core should be added to increase the volume. 3. The cost is quite high. 4. Compensation should be done twice.

There are two methods using B as auxiliary power:

I. The AC input can use a low frequency transformer as auxiliary power during isolation. However, there are some problems and restrictions as below: 1. The volume of the low frequency transformer is large and it occupies more space. 2. The efficiency is low, and the power loss is high. 3. A voltage regulator should be added for the secondary circuit, so the cost increases.

II. The DC input can use a feedforward feedback PWM circuit or a ringing chock converter (RCC) circuit for auxiliary power isolation. However, there are some problems and restrictions as below: 1. The effect of the power regulation is not good, and is easily influenced by temperature. 2. The efficiency is low, and the power loss is great. 3. The frequency between the auxiliary power and the main power is different and they easily interfere with each other. 4. The circuit is too complicated, so the cost is high.

The problems for the starting method are: In method A, it is started by the input power directly. An additional device is necessary for primary/secondary feedback isolation. In method B, the voltage of the auxiliary power changes as the main output load varies. The voltage may exceed reasonable working voltage values.

In addition to the above isolating method, the switching power supply needs to have protective measures for excessive current and short circuit, for its own safety and the safety of its users. The way of doing this is to induce the current to the voltage and input this induced voltage value into the current limit comparator. This value is compared with a reference potential. When a short circuit happens, it causes the pulse width in the PWM control IC to close. Hence, the current works Pulse-by-pulse. This periodical frequency is usually much lower than the work frequency, and the pulse width is very small.

However, if the short circuit protection is too long, it is easy to cause damage to the components. The periodical pulse causes the current limit. Although it has the foldback current limit manner, the output is limited under small root mean square (abbreviated as rms below) current value. The momentary current is even larger than the maximum output current (sometimes much larger). When the switch works continuously and the output circuit is short, the total energy loss=$(V_{in\ rms}) \times (I_{in\ rms})$, the energy loss on the switching power supply=$(V_{in\ rms}) \times (I_{in\ rms}) - (V_{out\ rms}) \times (I_{out\ rms})$. Since the $V_{out\ rms}$ is very small, the power module generates a great deal of heat. As the heat accumulates, the temperature of the power module increases, and the safe operating area of the components decreases. When it reaches the critical limit, it causes damage very easily.

SUMMARY OF THE INVENTION

According to the above problems in the prior isolating and starting methods of the switching power supply, the invention provides a kind of programmed isolating and starting method and device of the switching power supply. The circuit is easy and its volume is small. Because it is a software application, it omits the use of hardware.

Another objective of the invention is to provide a kind of programmed isolating starting method and device of the switching power supply for which feedback compensation is easy. The output voltage directly sends feedback to the error amplifier of the IC. The square-wave driving signal passes through the transformer T2, and then is isolated to the primary driving switch (transistor). This is regarded as a liner relation in the mathematics mode. Because its bandwidth (the bandwidth of the error amplifier) is larger, it is easy to design the compensator.

Another objective of the invention is to provide a kind of programmed isolating and starting system of the switching power supply, whose starting circuit has an isolating function. The circuit has an automatic protection function for the over-current/short circuit, and a judging and protecting function of the over-current/short circuit at the temporary state or long time state.

Another objective of the invention is to provide a kind of programmed isolating starting system of the switching power supply, for which the time for starting power is very short. The power loss is low, and there is no problem of loss of the auxiliary power conversion for a long time.

According to the programmed isolating starting system of the switching power supply provided in the invention, the PWM is put at the secondary circuit. It is not used as an isolating auxiliary power. Instead, it is used as an isolating starting power. The secondary power output circuit provides the necessary power for the PWM to control the IC. The starting power uses a device that contains a program to control the starting, e.g. a Micro-control Unit. Once the starting is finished and the PWM controlling circuit works normally, the program stops working. If the system needs to restart, it can automatically restart via the hardware and the program of the invention. Even when the input voltage has a very large difference, the system can be started and the working voltage can be provided via the hardware and the software.

The programmed isolating and starting method of the switching power supply in the invention has the advantage of being a simple circuit, with little noise, small volume, lower cost and easy compensation, and is appropriate for the military market. Another benefit is to have an automatic or intelligent over-current/short circuit protection function. When the output is over-current or short circuited, there is almost no energy loss, and the additional circuit can be omitted or can be very simple.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
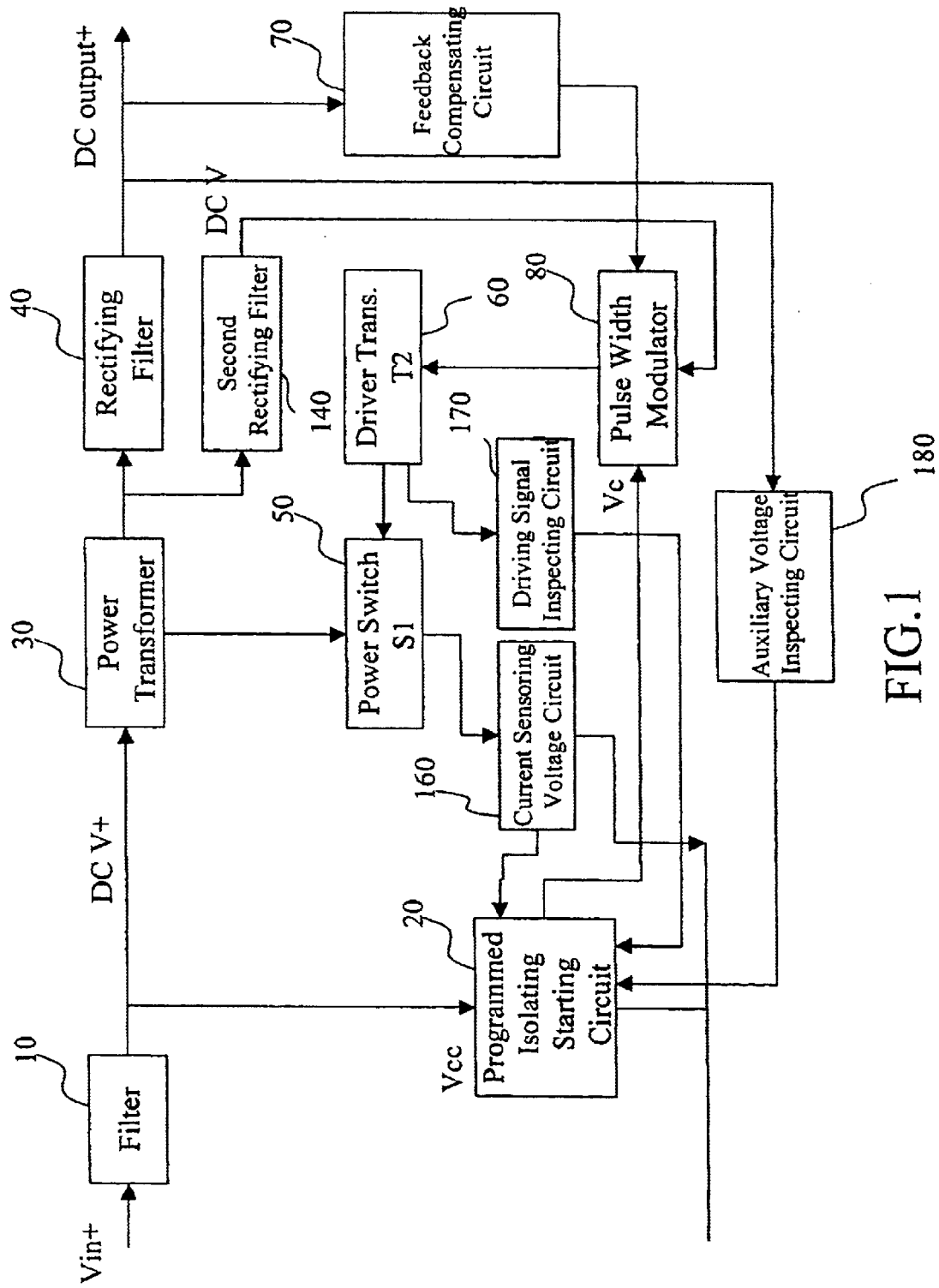
FIG. 1 is a circuit diagram of the programmed isolating starting method of the switching power supply in the invention.

Please refer to FIG. 1, which is a circuit diagram of the programmed isolating starting method of the switching power supply.

Figure 2:
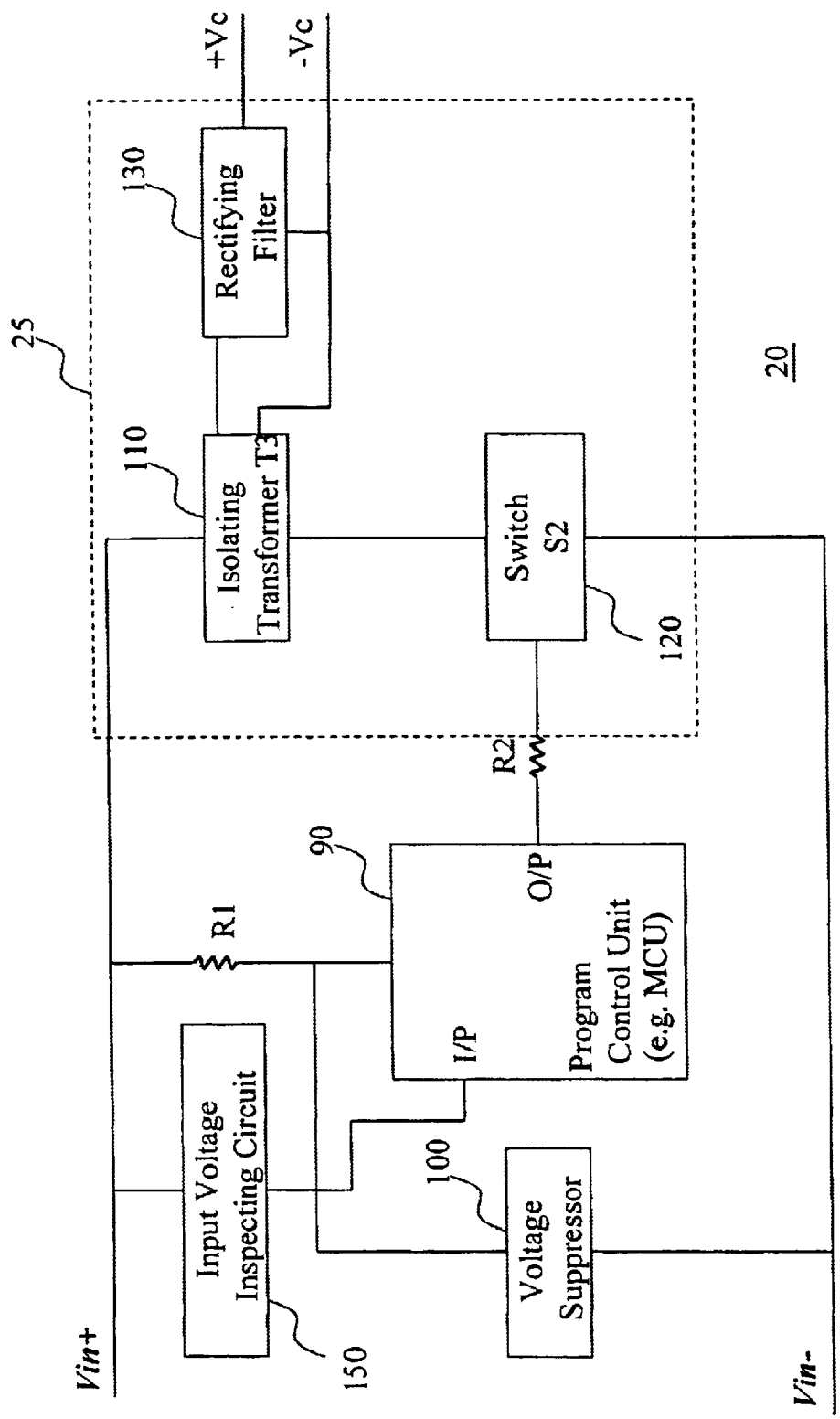
FIG. 2 is a diagram of the programmed isolating starting circuit in the invention.

In the programmed isolating starting circuit of the switching power supply in the invention, the real line block contains a filter 10, a programmed isolating starting circuit 20 (detail is shown in FIG. 2), a power transformer 30, a rectifying filter 40, a switch 50, a driving transformer 60, a feedback compensating circuit 70 and a pulse width modulator 80.

A detailed illustration of the system connection and the function of the invention is described as follows. The filter 10 placed in the primary circuit connects to the input power, filters the input power and outputs it as DC voltage to the input end of the programmed isolating starting circuit 20 and the primary end of the power transformer 30. The programmed isolating starting circuit 20 starts to work, builds up starting voltage, and provides voltage to the pulse width modulator 80. The pulse width modulator 80 that is placed in the secondary circuit provides secondary power to the driving transformer 60 after it receives the power from the programmed isolating starting circuit 20. The power is coupled to the primary end of the driving transformer 60 and it provides power to the switch 50 in a closed state. This makes the switch 50 open-close, and conducts the primary end of the power transformer 30. The primary power is coupled to the secondary power. Therefore, the output voltage is built up, and the starting process is completed.

When the starting is finished, the programmed isolating starting circuit 20 stops working immediately. Meanwhile, the output voltage is built up. The rectifying filter 40 connecting to the secondary end of the power transformer 30 continues to provide DC output voltage. This voltage is adjusted to a stable output DC voltage by the feedback compensating circuit 70 and the pulse width modulator 80. The required power of the pulse width modulator 80 after starting can be provided directly by the output power supply.

The invention also provides protection measures for over-current/short circuit. Only if the output voltage decreases to the value that auxiliary power cannot normally support the functioning of the pulse width modulator 80 is there no driving energy to do the high frequency switching. The output power is terminated, the programmed isolating starting circuit 20 has no more starting capability, and the other components all stop working. Therefore, strict protection measures for the over-current/short circuit should be executed to avoid damage to the whole system (including injury to users) due to excessive current or short circuit.

However, some of the over-current or short circuit is only temporary. The PWM controlled circuit should have the function of restarting, and the program can judge the state of over-current or short circuit and restart the circuit. The three dotted line block in FIG. 1 includes a current induced voltage circuit 160, a driving signal inspecting circuit 170, and an auxiliary voltage inspecting circuit 180. The principal function of this block is to inspect the decreasing message of the output voltage. Any part of above three block can make the system in the invention restart automatically when the over-current or short circuit occurs.

First of all, a current induced voltage circuit 160 can be added. In the input loop series a resistance or current transformer (CT), the induced voltage increases as the current increases. The voltage is zero when there is no current. If the whole circuit works normally, a higher DC voltage is induced. If the protection for the current limit or the short circuit happens, a lower DC voltage is induced. The induced voltage that is inputted to the programmed isolating starting circuit 20 can be used to judge the DC voltage. Once the lower DC voltage is inspected, the program executes the restarting function.

Secondly, the driving signal inspecting circuit 170 can be added. The principle is similar to the current induced voltage circuit 160. One more winding of coils is wound on the driving transformer 60. This can rectify and filter the voltage to a DC voltage. If the whole circuit works normally, higher DC voltage is induced. If the protection for the current limit or the short circuit happens, lower DC voltage is induced. Once the lower DC voltage is inspected, the program executes the restarting function.

Finally, the auxiliary voltage inspecting circuit 180 can be added. The output voltage can be inspected and sent to the primary circuit. However, it should be isolated. The optocoupler can be used for isolation. The secondary voltage can be isolated via the current transfer ratio (CTR), and sent to the primary programmed isolating starting circuit 20. If the output voltage is normal, the transferred voltage should be a fixed value, and can be used to judge the work state. If the protection for the over-current or the short circuit happens, the output voltage will decrease. Therefore, the transferred voltage to the primary programmed isolating starting circuit 20 decreases, and the program executes the restarting function.

Moreover, when the output voltage is not appropriate for auxiliary power (voltage is too high or too low ), the invention also provides a kind of auxiliary power. One more winding of coils is wound around the power transformer 30. The voltage is rectified to a DC voltage after passing the second rectifying filter 140. If the voltage value is within the reasonable Vc voltage, it provides the power to make the circuit of the pulse width modulator 80 work normally The programmed isolating starting circuit 20 described in FIG. 1 can be referred to FIG. 2.

The input power supplies Vcc voltage to the program control unit 90 and its surrounding circuit. This Vcc voltage can suppress the program control unit 90 to a normal working voltage range via the resistance R1 and the voltage suppressor 100. The program control unit 90 provides the switching frequency to the power converter 25 that is used for high frequency switching. The starting power is isolated and coupled to another secondary rectifying filter 130 by the isolating transformer 110 in order to start the controlled IC of the pulse width modulator 80 (in FIG. 1) within a normal working range. The switch 120 (which is controlled by the program control unit 90) can be turned off to stop the power transformation.

Moreover, the input voltage inspecting circuit 150 can be used to judge the input voltage. The input voltage inspecting circuit 150 can use two series of resistance to divide the voltage. 1. The dividing analog voltage signal is converted to a digital signal (A to D function ). The program of the program control unit 90 can be used to judge the input voltage; 2.or the divided voltage can be compared with a reference voltage. A high or low signal is passed to the program control unit 90 via the comparator to judge the magnitude of the input voltage. The judgment of this voltage can help the system to effectively control the normal starting voltage (Vc) when the input voltage range is very large.

The isolating method in the invention is the electric isolation between the primary and the secondary circuit via the programmed isolating starting circuit 20, the power transformer 30 and the driving transformer 60.

Figure 3A:
FIG. 3A is a suppressing circuit diagram in the invention.
Figure 3B:
FIG. 3B is a step-down circuit diagram in the invention.

When the output voltage is within the reasonable Vc voltage, the suppressing circuit is made. The function of the circuit is to block the starting power to the output load, to avoid the PWM circuit not being able to start. The suppressing circuit can be referred to FIG. 3A. Furthermore, when the output voltage>reasonable Vc voltage, a step-down circuit will be needed to prevent the Vc voltage from becoming es too large (please refer to FIG. 3B).

Figure 4:
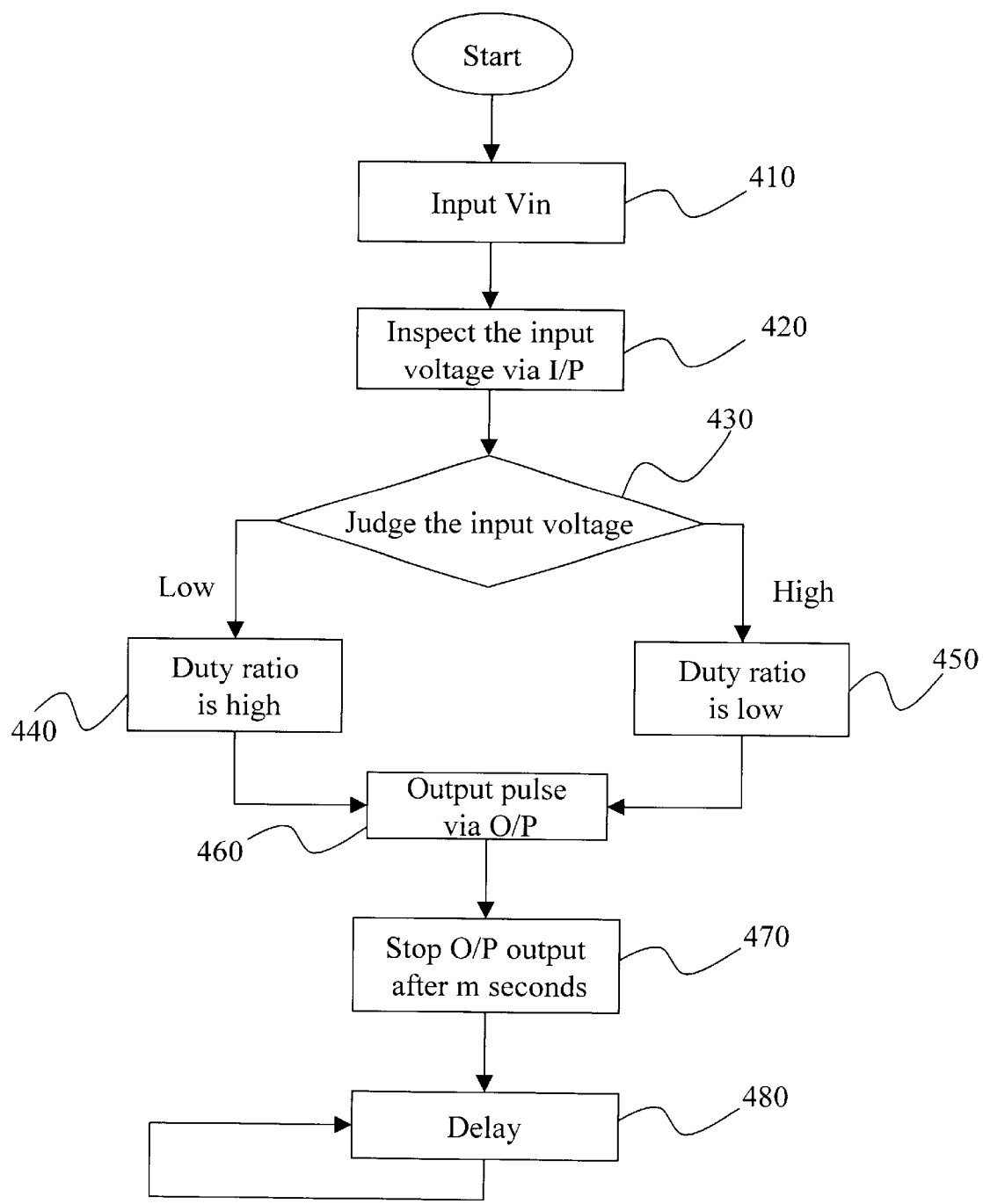
FIG. 4 is a flow chart of the programmed starting method in the invention.

The system in the invention can then be started. Even the maximum and the minimum of the output voltage have a big difference (please refer to FIG. 4 & FIG. 2).

First, inspect the input voltage of the Vin(step 410), inspecting signal inputs to the I/P end of the program control unit 90 (step 420), and judge the input voltage (step 430). If it is a low voltage input, then the duty ratio will be increased (step 440); if it is a high voltage input, then the duty ratio will be reduced (step 450). The pulse is the output from O/P (step 460) and drives the switch 120 to adjust the voltage to the normal working range. At this time, the programmed isolating starting circuit 20 can stop working. In other words, after m seconds, the O/P output can be stopped (step 470), and then into the delayed state (step 480), until it is needed to restart again.

Figure 5:
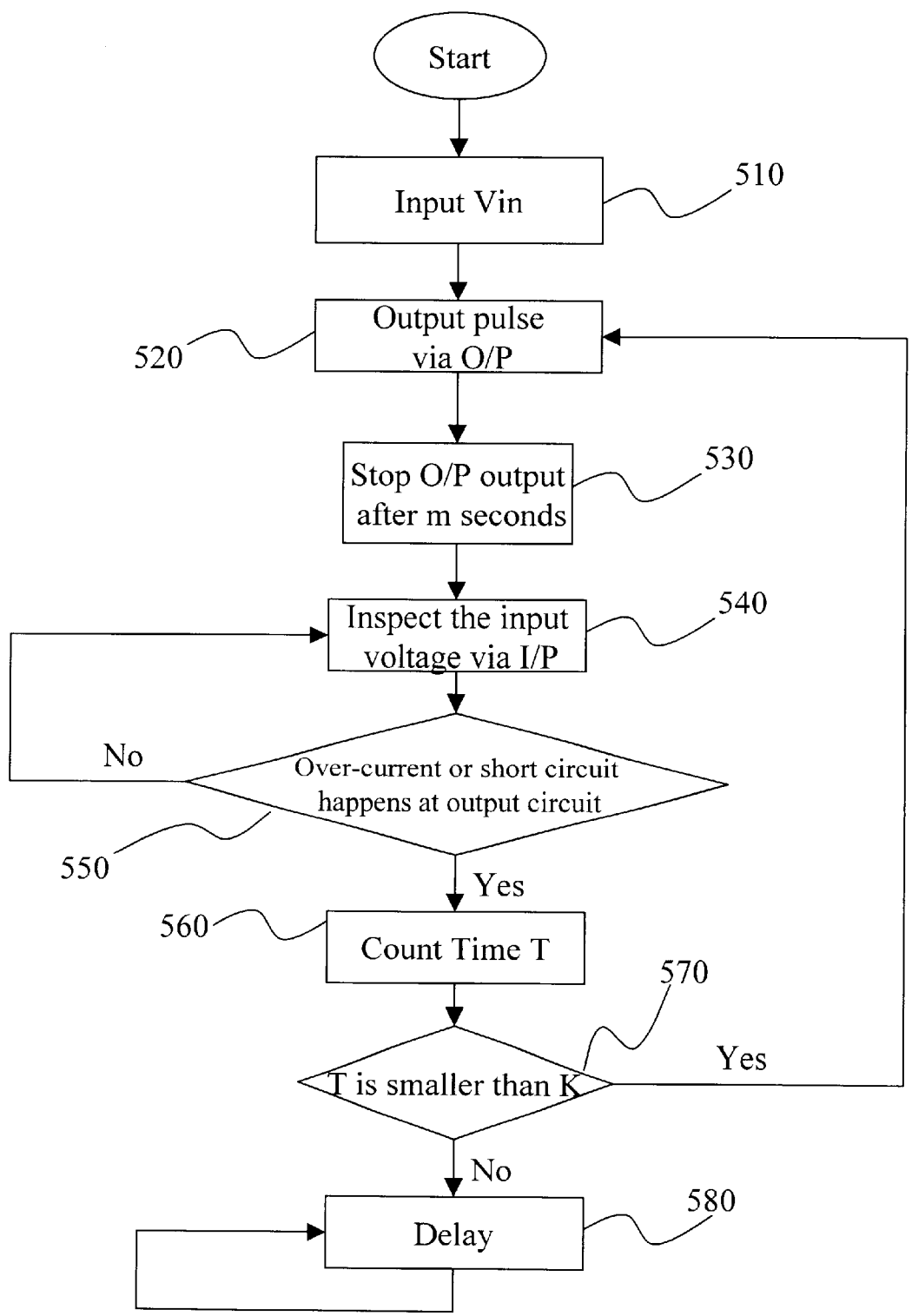
FIG. 5 is a flow chart of the concrete executing method of the programmed restarting system in the invention.

Moreover, the control of restarting can be executed directly by the program control unit 90 (refer to FIG. 5, which is a flow chart of the method of the program restarting execution). The starting program for the programmed isolating starting circuit 20, in other words, Vin is an input (step 510). After the programmed isolating starting circuit, O/P is the output square-wave (step 520). After m seconds, the starting is finished and O/P will stop output (step 530). Then, the I/P end of the program control unit 90 can be used to inspect whether there is change (step 540). If the output over-current or short circuit occurs (step 550), the programmed isolating starting circuit 20 outputs an O/P squarewave. That means the restarting is kept on until the output voltage recovers. If there is no over-current or short circuit occurring, then continue inspecting the I/P voltage.

The invention also includes a mechanism for counting time T (step 560). When the temporary state of the overcurrent or the short circuit happens, the restarting restarts in k seconds (step 570). If T is longer than k seconds and the over-current or short circuit state is still occurred, then stop restarting, and into the delayed state (step 580). When the output power stops, the other components stop working.

FIGS. 6–9 show data charts of an example in which the input voltage is +28 Vdc and the output voltage is +20 Vdc.

Figure 6:
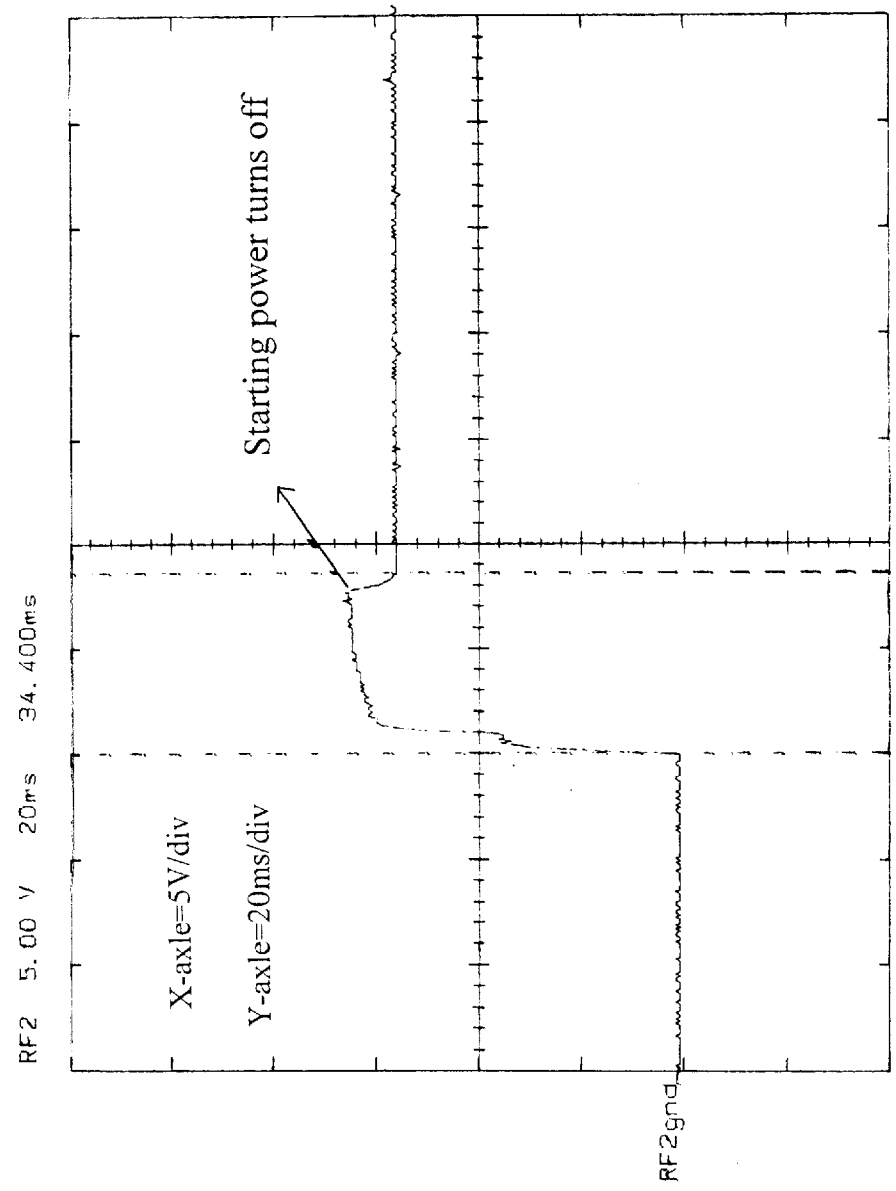
FIG. 6 is an oscillogram of the building up of the Vc voltage.
Figure 7:
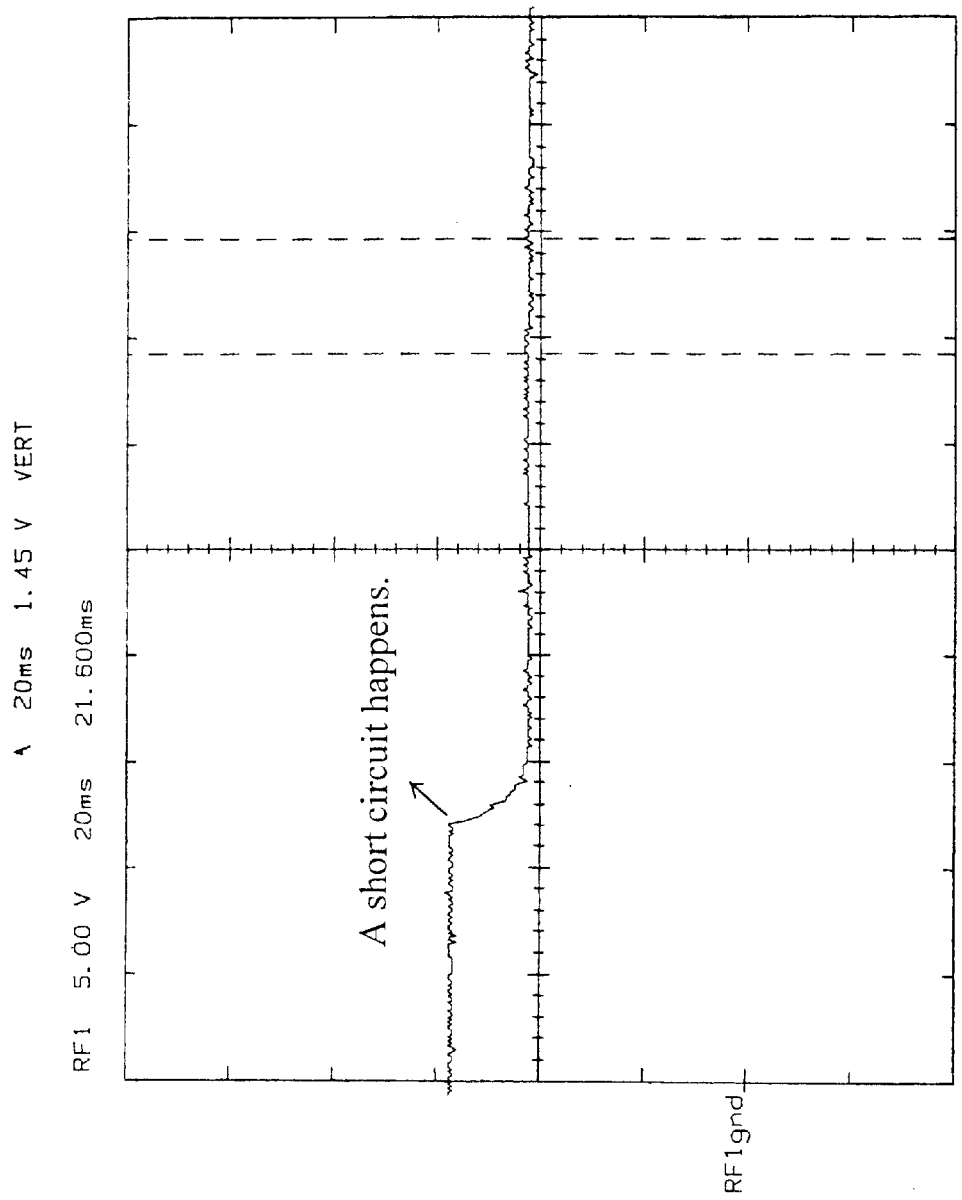
FIG. 7 is an oscillogram of the auxiliary power Vc at the output short circuit.
Figure 8:
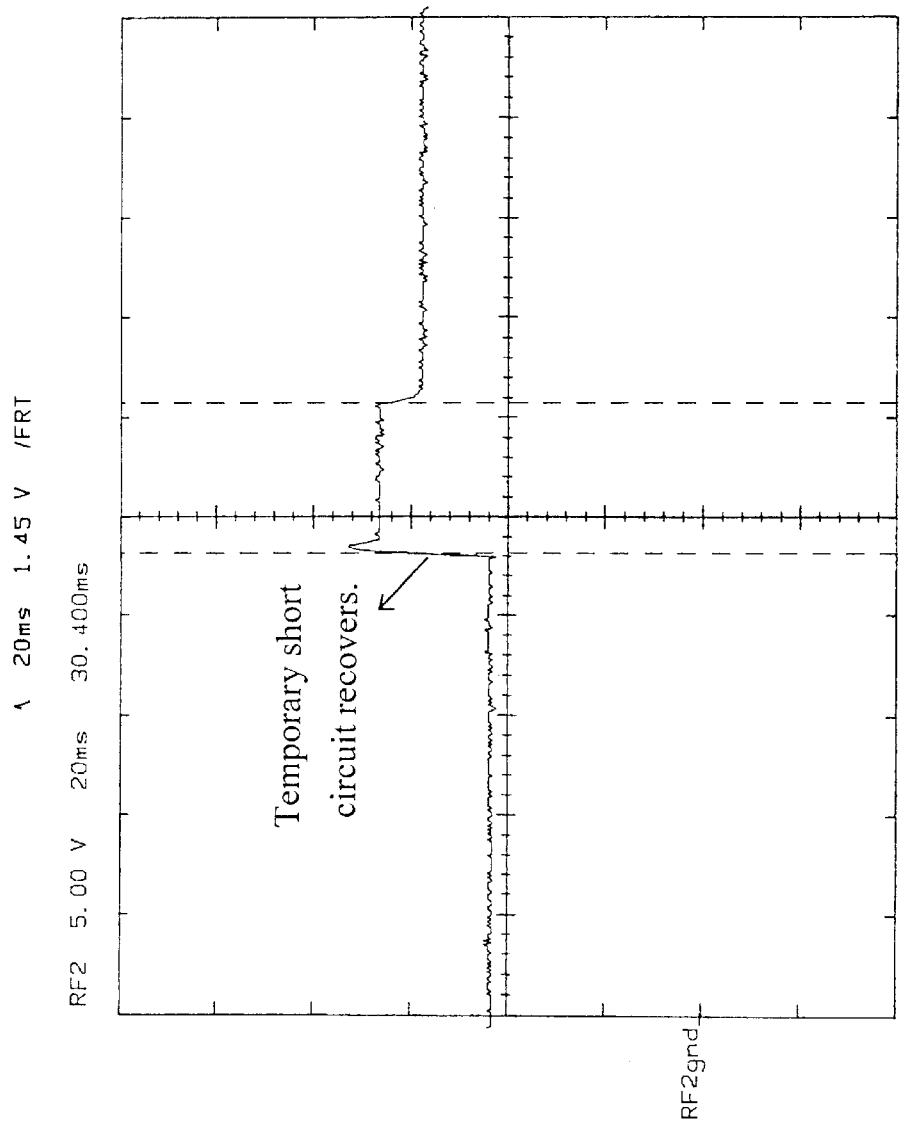
FIG. 8 is an oscillogram of the auxiliary power Vc at the output temporary short circuit.
Figure 9:
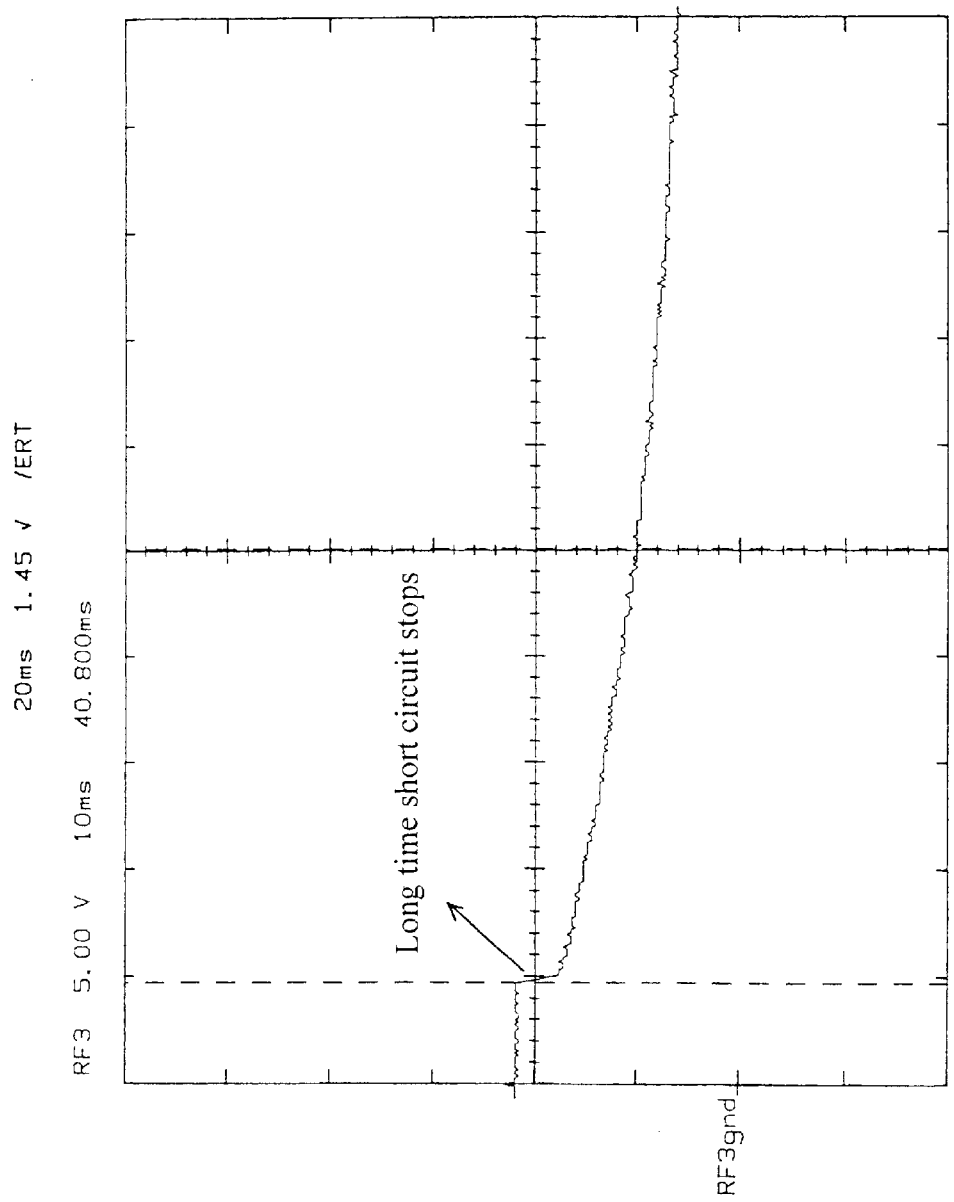
FIG. 9 is an oscillogram of the auxiliary power Vc at the output long time short circuit.

FIG. 6 is an oscillogram of the building up of the Vc voltage. When starting power after 30 mS, the switch 120 turns off. Then the output voltage provides the working voltage of the auxiliary power to keep it working normally. FIG. 7 shows an oscillogram of the auxiliary power Vc when the output circuit shorts out. When a short circuit occurs, the starting circuit restarts. The starting circuit provides voltage to the auxiliary power, and the voltage is reduced to 10V. FIG. 8 shows an oscillogram of auxiliary power Vc at the temporary output short circuit. When the temporary short circuit relieves, the output voltage returns to normal. The starting circuit and the output power provide the auxiliary power simultaneously. The voltage increases to 17V, after 30 mS auxiliary power is provided by the output power only, and the voltage is stabilized at 14.5V. FIG. 9 shows an oscillogram of the auxiliary power Vc at a long time output short circuit. If the output circuit is still short-circuited after k seconds, the starting circuit does not work. The auxiliary power voltage is reduced to 0 and the pulse width modulator 80 does not work anymore.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A programmed isolating starting system of a switching power supply, which comprises:
    a filter connected to an input power, which is used to output a DC voltage from the input power;
    an isolating starting circuit connected to the filter, which has an input end to receive said DC voltage and provides a starting voltage, a program controlling the starting of the isolating starting circuit;
    a pulse width modulator connected to an output end of the programmed isolating starting circuit, which is used to receive the starting voltage and output a pulse voltage, the program stopping the starting of the isolating starting circuit when the pulse width modulator reaches normal operation;
    a driving transformer having a secondary end connected to the pulse width modulator, which is used to transfer the pulse voltage into a driving voltage, and output a driving voltage to a primary end of said driving transformer;
    a power transformer connected to an output end of the filter, which is used to transfer said DC voltage to a working voltage;
    a first switch connected to the primary end of the driving transformer and a primary end of the power transformer, which is used as a switch of the primary end of the power transformer;
    a first rectifying filter connected to a secondary end of the power transformer, which is used to rectify and transfer the working voltage into an output voltage; and
    a feedback compensating circuit having an input end connected to the output end of the DC output voltage and an output end connected to an input end of the pulse width modulator, which is used to stabilize the output voltage.

2. The programmed isolating starting system of claim 1, wherein the programmed isolating starting circuit includes:
    an input voltage inspecting circuit having an input end connected to the input power, which is used to judge the level of the input voltage;
    a program control unit having an input end connected to the output end of the input voltage inspecting circuit, which is used to judge the magnitude of the input voltage so as to control the normal starting voltage and send a stop starting order after a predetermined period of time;
    a voltage suppressor to provide the program control unit a normal working voltage; and
    a power converter connected to the an output end of the program control unit, which is used to transfer the input voltage into said starting voltage, including:
        a second switch connected to the output end of the program control unit, which is used to receive the controlling voltage and switches to the off state after receiving the order of stopping start;
        an isolating transformer having two primary both ends each connected to the input power and the switch, which is used to transfer the input voltage to the programmed starting voltage; and
        a second rectifying filter connected to the secondary end of the isolating transformer, which is used to rectify the programmed starting voltage to the normal starting voltage.

3. The programmed isolating starting system of claim 2, wherein the program control unit is a micro control unit (MCU).

4. The programmed isolating starting system of claim 1, wherein the system further includes a circuit selected from a group of a current inspecting voltage circuit, a driving signal inspecting circuit and an auxiliary voltage inspecting circuit.

5. The programmed isolating starting system of claim 4, wherein the current inspecting voltage circuit having an input end of the current inspecting voltage circuit connected to the switch and an output end connected to the programmed isolating starting circuit is used to transfer a current signal of the switch to a voltage signal and send it to the programmed isolating starting circuit, when the voltage signal is at low level, the programmed isolating starting circuit provides the starting voltage.

6. The programmed isolating starting system of claim 4, wherein the driving signal inspecting circuit having an input end of connected to the other primary end of the driving transformer and an output end connected to the programmed isolating starting circuit is used to output a sensorial voltage, when the sensorial voltage is at low level, the programmed isolating starting circuit provides the starting voltage.

7. The programmed isolating starting system of claim 4, wherein the auxiliary voltage inspecting circuit having an input end connected to a DC output voltage and an output end connected to the programmed isolating starting circuit via electrical isolation to isolate and output the output voltage level to the programmed isolating starting circuit, when the output voltage is at low level, the programmed isolating starting circuit provides the starting voltage.

8. A programmed starting method of a switching power supply using a program of a program control unit, transfers an input voltage into a fixed output controlling voltage to start a pulse width modulator of the switching power supply, comprising the steps of:
    providing an input voltage inspecting circuit to inspect the input voltage level;
    determining the input voltage level by the program of the program control unit;
    reducing a duty ratio when the input voltage level is high and increasing the duty ratio when the input voltage level is low;
    outputting the controlling voltage by the program control unit; and stopping the output of the controlling voltage after a predetermined period of time.

9. A programmed restarting method of a switching power supply using a program of a program control unit, which transfers an input voltage into a fixed output controlling voltage in order to start the work of a pulse width modulator of the switching power supply and provides the restarting voltage when the system stops, comprising the steps of:

providing the controlling voltage by the program control unit, and transfer a starting voltage to the pulse width modulator;

stopping the output of the controlling voltage after a predetermined period of time;

outputting a sensorial voltage by a current induced voltage circuit, a driving signal inspecting circuit or a auxiliary voltage inspecting circuit;

determining the input voltage, starting to count time T and, when the output voltage is too low, providing the controlling voltage again by the program control unit and transferring a starting voltage by the program control unit to the pulse width modulator; and when T is larger than a second predetermined period of time, the program control unit stops providing the controlling voltage.

* * * * *